United States Patent [19]
Asberg

[11] 3,774,933
[45] Nov. 27, 1973

[54] WHEEL SUPPORT FOR AN ENGINE PROPELLED ROAD VEHICLE

[75] Inventor: Sture Lennart Asberg, Savedalen, Sweden

[73] Assignee: SKF Industriele En Ontwikkeling Maatschappij NV, Amsterdam, Netherlands

[22] Filed: Feb. 3, 1971

[21] Appl. No.: 112,285

[30] Foreign Application Priority Data
Feb. 5, 1970 Netherlands ...................... 7001649

[52] U.S. Cl. .............. 280/96.1, 188/18 A, 308/191
[51] Int. Cl. ............................................. B62d 7/08
[58] Field of Search ..................... 301/5, 5.7, 126; 280/96.3, 96.1; 308/191; 188/18 A

[56] References Cited
UNITED STATES PATENTS

| | | |
|---|---|---|
| 1,982,377 | 11/1934 | Duby .................................. 301/5 R |
| 3,332,518 | 7/1967 | North et al. ...................... 188/18 A |
| 3,552,813 | 1/1971 | Brescia, Sr. et al................. 308/191 |
| 3,295,626 | 1/1967 | Cadiou............................... 280/96.3 |
| 3,295,636 | 1/1967 | Adams.............................. 188/18 R |

Primary Examiner—Kenneth H. Betts
Assistant Examiner—John P. Silverstrim
Attorney—Howson & Howson

[57] ABSTRACT

A preassembled wheel support unit having inner and outer annular members with confronting raceways for relative rotation and means for connecting one annular member to the vehicle and the other annular member to the wheel and brake disk. The pitch diameter of the raceways is at least twice the overall axial width of the annular members whereby forces resulting from functioning of the brake are acting at substantially the same diameter and close to forces from the wheel and reaction forces from the vehicle.

3 Claims, 2 Drawing Figures

INVENTOR:
STURE LENNART ÅSBERG

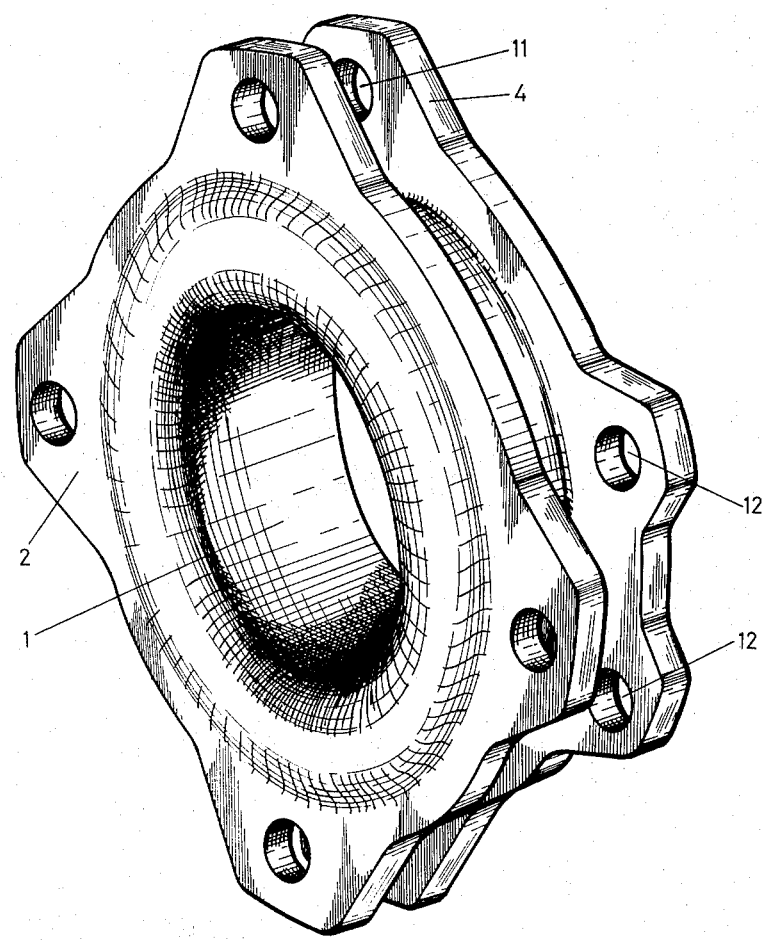

WHEEL SUPPORT FOR AN ENGINE PROPELLED ROAD VEHICLE

The present invention relates to a wheel support for a disc braked wheel of an engine propelled road vehicle, said wheel support comprising an axial radial ball or roller bearing unit, formed by two race carrying structural members having the balls or rollers between concentric parts of the structural members, each structural member having integral means, such as holes, for detachably connecting the unit to the vehicle on one hand and to the wheel and brake disc on the other hand. Wheel supports of this kind are known from the published Dutch Pat. applications 68.05108 and 68.05109.

With disc brakes the friction elements which from opposite sides can be pressed against the disc, are placed in one or more housings straddling the disc and secured to a non-rotating part of the vehicle wheel suspension such as an axle housing or a king pin body. Said calliper housing contains the means, by means of which the friction blocks can be brought into engagement with the disc, said means usually being formed by hydraulic cylinders.

In the older proposals no attention has been paid to the location of the calliper housing it being assumed that this calliper housing still had to be attached to the stationary part in the conventional manner by providing said stationary part with a bracket, flange or extension to which the calliper housing could be secured.

Purpose of the present invention is a further development of the older proposals to provide a better solution for the attachment of the calliper housing.

According to the invention this is achieved in that the structural member having the means for connecting it to the vehicle has been provided with means for connecting to it the calliper housing of the brake. This means that the calliper housing is directly secured to that part of the unit which, usually at another place, is secured to the vehicle, which means that no special provisions are necessary on the king pin body or the axle housing, whilst the provision on the stationary structural member of the unit according to the invention are extremely small; normally two holes are sufficient. In case of L-shaped structural members all connecting means of the unit are to this end at substantially the same radial distance from the axis and the forces acting on the flanges of the structural members, which forces result from the funtioning of the brake, are accordingly acting at the same diameter and close to the incoming forces from the wheel and the reaction forces from the vehicle.

According to the invention all the connecting means may have such a large radial distance from the axis that a radially outer-most position of the calliper housing of the brake with respect to the rim is obtained and the bearing elements are radially spaced from the connecting means only by a distance necessary to accommodate the outer structural member. This means that the connecting means are at a large diameter where there can be more material to take up the occurring loads and to transmit them in the shortest way to the suspension and the wheel.

The connecting means for the calliper housing can be circumferentially spaced from the connecting means of the flange of the structural member for connecting it to the vehicle. Accordingly the forces coming from the brake towards the body follow the shortest way with the result that there is less material the possibility of deformation of which has to be taken into account. The result is a more rigid and lighter construction, easy and cheap to manufacture. The invention now will be further elucidated with reference to the drawing.

FIG. 2 shows the embodiment of FIG. 1 in perspective.

Figure 1:
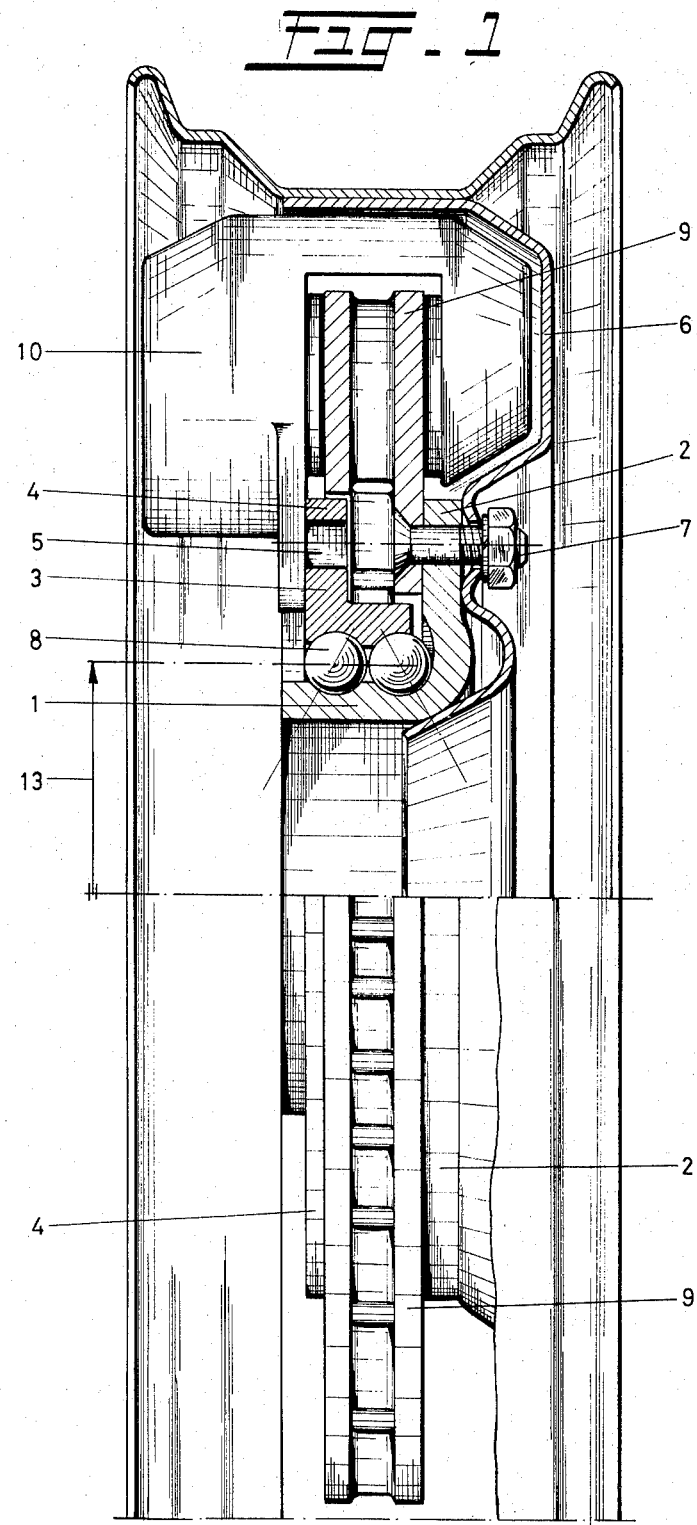
FIG. 1 shows partly in cross section an embodiment of the wheel support for a non-driven wheel.

The wheel support of FIGS. 1 and 2 comprises an inner structural member 1 with a radial flange 2 and an outer structural member 3 with integral flange 4. Both flanges 2 and 4 are provided with bolt holes at the pitch diameter 5 which holes form the integral connecting means.

To the flange 2 of the structural member 1 a wheel 6 and a brake disc 9 are secured by means of bolts 7.

The calliper or brake block housing 10 is secured to the flange 4. It is shown in the plane of the drawing. Normally this housing is provided on the front-side of the brake disc and accordingly not shown in a vertical section. This follows from FIG. 2 according to which the flange 4 has upper and lower holes 11 for the attachment to the vehicle and holes 12 for the attachment of the calliper.

In the embodiment of FIGS. 1 and 2 a two row biaxial radial ball bearing is used, indicated with the reference 8. Said bearing has a pitch diameter 13 which under the constructional circumstances shown in FIG. 1 is the largest diameter possible.

It follows clearly from FIG. 2 that the means for attaching the calliper housing are extremely simple without any risk of deformation of the radial flanges 2 and 4 of the structural members.

What we claim is:

1. A preassembled support for a disc-braked wheel of an engine propelled road vehicle comprising inner and outer annular members relatively rotatable about a central axis, said annular member having confronting raceways, a plurality of rolling elements in the annular space between said raceways, each of said members having a radially directed flange, first connecting means on the flange of one of said members for detachably connecting the same to the vehicle, second connecting means on the flange of said other member for connecting the same to wheel and brake disc, third connecting means on the flange of said one member circumferentially spaced from said first connecting means, the pitch diameter of the pitch circle of said rolling elements being at least twice the overall axial width of said annular members, at least two of said connecting means being spaced closely to the pitch circle of the rolling elements whereby forces resulting from functioning of the brake are acting at substantially the same diameter and close to forces from the wheel and reaction forces from the vehicle.

2. A preassembled support as claimed in claim 1 wherein said third connecting means is connected to the calliper housing of the brake.

3. A preassembled support as claimed in claim 1 wherein all of said connecting means are closely spaced to the pitch circle of the rolling elements and at substantially the same radial distance from the central axis.

* * * * *